US009648862B1

(12) United States Patent
Lievano

(10) Patent No.: US 9,648,862 B1
(45) Date of Patent: May 16, 2017

(54) TELESCOPING SPIDER WEB REMOVAL BRUSH

(71) Applicant: Matthew Lievano, Tracy, CA (US)

(72) Inventor: Matthew Lievano, Tracy, CA (US)

( * ) Notice: Subject to any disclaimer, the term of this patent is extended or adjusted under 35 U.S.C. 154(b) by 164 days.

(21) Appl. No.: 14/629,553

(22) Filed: Feb. 24, 2015

(51) Int. Cl.
A01M 3/00 (2006.01)
A01M 3/02 (2006.01)
A01M 7/00 (2006.01)
B25G 1/04 (2006.01)
A46B 11/00 (2006.01)

(52) U.S. Cl.
CPC ............. *A01M 7/005* (2013.01); *A01M 3/00* (2013.01); *A01M 3/02* (2013.01); *A01M 7/00* (2013.01); *A01M 7/001* (2013.01); *A01M 7/0003* (2013.01); *A01M 7/0007* (2013.01); *A01M 7/0089* (2013.01); *A46B 11/002* (2013.01); *B25G 1/04* (2013.01)

(58) Field of Classification Search
CPC .......... A01M 3/00; A01M 3/02; A01M 3/027; A01M 7/00; A01M 7/0003; A01M 7/0007; A01M 7/001
USPC ............ 43/133, 134, 137, 900; 15/105, 106; 239/289; 222/192; 401/190, 205, 196
See application file for complete search history.

(56) References Cited

U.S. PATENT DOCUMENTS

| 109,720 | A | * | 11/1870 | Darnall | B63H 16/04 416/501 |
| 161,870 | A | * | 4/1875 | Dorrison | A01M 3/02 43/137 |
| 395,022 | A | * | 12/1888 | Wells | A01M 3/02 43/137 |
| 454,117 | A | * | 6/1891 | Myers | A01M 21/043 43/900 |
| 532,259 | A | * | 1/1895 | Bigelow | A01M 3/02 43/137 |
| 552,703 | A | * | 1/1896 | Burrowes | A01M 3/02 43/137 |
| 644,303 | A | * | 2/1900 | Rice | A01M 3/02 43/137 |
| 648,794 | A | * | 5/1900 | Rice | A01M 3/02 43/137 |
| 729,528 | A | * | 6/1903 | Bement | A01M 3/02 15/197 |
| 969,191 | A | * | 9/1910 | Rice | A01M 3/02 43/137 |
| 984,332 | A | * | 2/1911 | Whitehead | A01M 3/02 43/137 |
| 998,022 | A | * | 7/1911 | Martin | A01M 3/02 43/137 |

(Continued)

FOREIGN PATENT DOCUMENTS

CN 201470626 5/2010
CN 201470626 U * 5/2010

(Continued)

OTHER PUBLICATIONS

Translation of CN201470626.*

*Primary Examiner* — Darren W Ark

(57) ABSTRACT

The telescoping spider web removal brush is a device that eliminates spider webs and spiders. Specifically, as the webs are brushed away a pesticide is applied to the area to eradicate the spiders associated with the web. The telescoping spider web removal brush is comprised of a brush, a pesticide application system and a telescopic wand.

5 Claims, 4 Drawing Sheets

(56) References Cited

U.S. PATENT DOCUMENTS

| | | | | |
|---|---|---|---|---|
| 1,016,734 A | * | 2/1912 | Bing | A01M 3/02 43/137 |
| 1,055,998 A | * | 3/1913 | Allis | A01M 3/02 43/137 |
| 1,319,669 A | * | 10/1919 | Muller | A46B 11/0013 30/41 |
| 1,393,571 A | * | 10/1921 | Riek | A01M 3/02 43/137 |
| 1,966,954 A | * | 7/1934 | Monroe | A01M 3/02 43/137 |
| 3,876,314 A | * | 4/1975 | Nehring | A61M 35/006 401/198 |
| 4,057,353 A | * | 11/1977 | Kitatani | A47L 13/26 401/204 |
| 4,086,718 A | * | 5/1978 | Swanson | A01K 97/24 43/17.2 |
| 4,120,115 A | * | 10/1978 | Mushkin | A01M 3/02 43/137 |
| 4,263,864 A | * | 4/1981 | Carter, Jr. | A01K 77/00 114/221 R |
| 4,413,756 A | * | 11/1983 | Kirley | B65D 83/205 222/402.11 |
| 4,415,288 A | * | 11/1983 | Gordon | A47K 7/028 401/196 |
| 4,625,402 A | * | 12/1986 | Kavoussi | B26B 21/446 222/192 |
| 4,694,605 A | * | 9/1987 | Garcia | A01M 3/02 43/137 |
| 4,971,471 A | * | 11/1990 | Sloan | A47L 13/20 15/210.1 |
| 5,307,959 A | * | 5/1994 | Bedore | B65D 83/203 222/174 |
| 5,309,669 A | * | 5/1994 | Jackson | A01M 1/245 43/124 |
| 5,365,880 A | | 11/1994 | South | |
| 5,419,077 A | * | 5/1995 | Tombarelli | A01M 1/2038 239/121 |
| 5,425,589 A | * | 6/1995 | Griffin | A47L 13/22 401/204 |
| 5,537,777 A | * | 7/1996 | Geeting | A01M 3/00 15/119.1 |
| 5,542,207 A | * | 8/1996 | Morris, Sr. | A01M 1/245 43/124 |
| D382,326 S | | 8/1997 | Geeting | |
| 6,161,328 A | * | 12/2000 | Sing | A01M 3/02 15/160 |
| 6,205,702 B1 | * | 3/2001 | Ammons | A01M 1/2038 43/124 |
| 6,244,771 B1 | * | 6/2001 | Bruggeman | A47L 1/15 401/205 |
| 6,325,304 B1 | * | 12/2001 | Brite | A01M 7/0046 239/333 |
| 6,574,915 B1 | * | 6/2003 | Allen | A01M 3/00 294/99.1 |
| 6,581,326 B1 | * | 6/2003 | Smith | A01M 1/2038 43/124 |
| 6,604,318 B1 | * | 8/2003 | Cassidy | A01M 1/245 43/132.1 |
| 6,688,036 B1 | * | 2/2004 | Gunn | A01M 13/003 43/125 |
| 6,808,717 B1 | * | 10/2004 | Bale | A01N 25/06 424/405 |
| 7,076,916 B2 | * | 7/2006 | Bianchini | A01M 1/2038 222/174 |
| 7,717,300 B1 | * | 5/2010 | Yarrusso, Jr. | A01M 1/2038 222/174 |
| 8,366,722 B2 | * | 2/2013 | Herweijer | A61B 17/50 606/131 |
| 8,844,193 B2 | * | 9/2014 | Luongo | A01M 1/2094 43/132.1 |
| 9,380,774 B2 | * | 7/2016 | Gellani | A01M 13/003 |
| 2008/0190012 A1 | * | 8/2008 | Chanthalangsy | A01M 3/02 43/137 |
| 2010/0037511 A1 | * | 2/2010 | Schier | A01M 3/02 43/137 |
| 2011/0289717 A1 | * | 12/2011 | Dhanvanthari | A46B 13/001 15/322 |
| 2013/0185880 A1 | * | 7/2013 | Rogers | A46B 11/002 15/106 |
| 2015/0136174 A1 | * | 5/2015 | Paro | A47L 13/26 134/6 |
| 2016/0278362 A1 | * | 9/2016 | Royal | A01M 3/02 |

FOREIGN PATENT DOCUMENTS

| | | |
|---|---|---|
| CN | 202446011 | 9/2012 |
| CN | 202446011 U * | 9/2012 |
| JP | 2003310130 A * | 11/2003 |

\* cited by examiner

TELESCOPING SPIDER WEB REMOVAL BRUSH

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of cleaning supplies and accessories and pest control, more specifically, a tool configured for the removal of spider webs.

SUMMARY OF INVENTION

The telescoping spider web removal brush is a device that eliminates spider webs and spiders. Specifically, as the webs are brushed away a pesticide is applied to the area to eradicate the spiders associated with the web. The telescoping spider web removal brush is comprised of a brush, a pesticide application system and a telescopic wand.

These together with additional objects, features and advantages of the telescoping spider web removal brush will be readily apparent to those of ordinary skill in the art upon reading the following detailed description of the presently preferred, but nonetheless illustrative, embodiments when taken in conjunction with the accompanying drawings.

In this respect, before explaining the current embodiments of the telescoping spider web removal brush in detail, it is to be understood that the telescoping spider web removal brush is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the telescoping spider web removal brush.

It is therefore important that the claims be regarded as including such equivalent construction insofar as they do not depart from the spirit and scope of the telescoping spider web removal brush. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
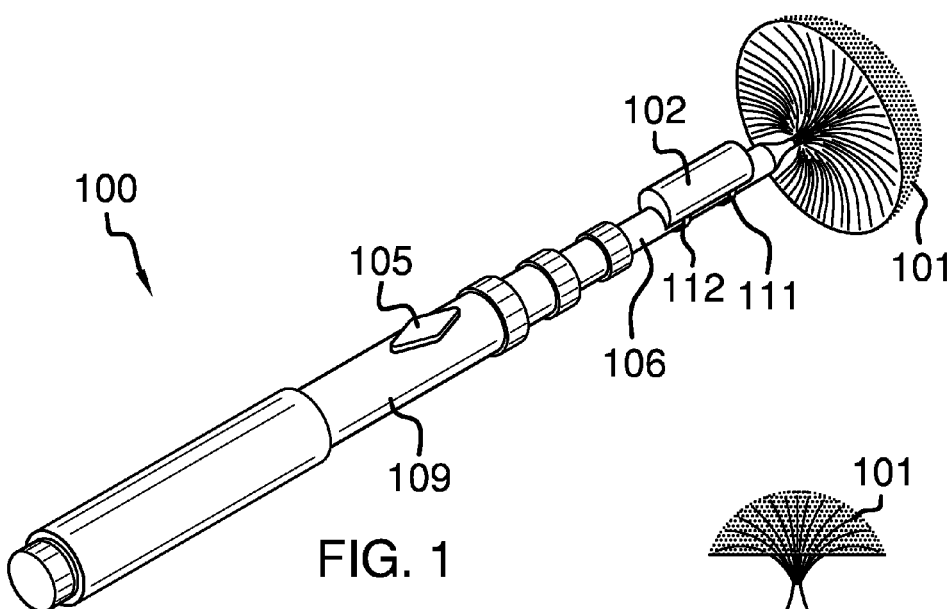
FIG. 1 is a perspective view of the telescoping spider web removal brush.
Figure 2:
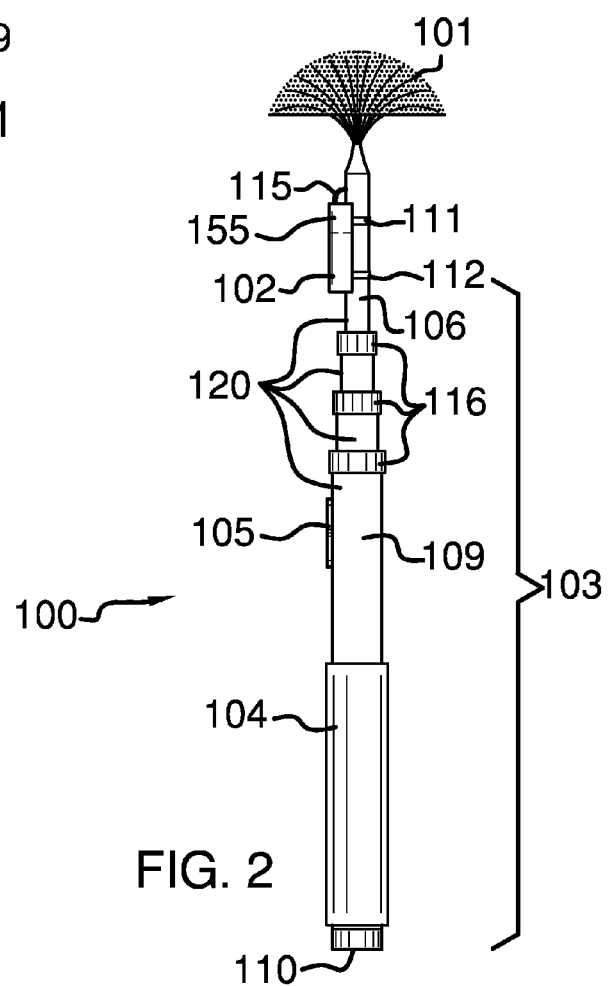
FIG. 2 is a side view of an embodiment of the disclosure.
Figure 3:
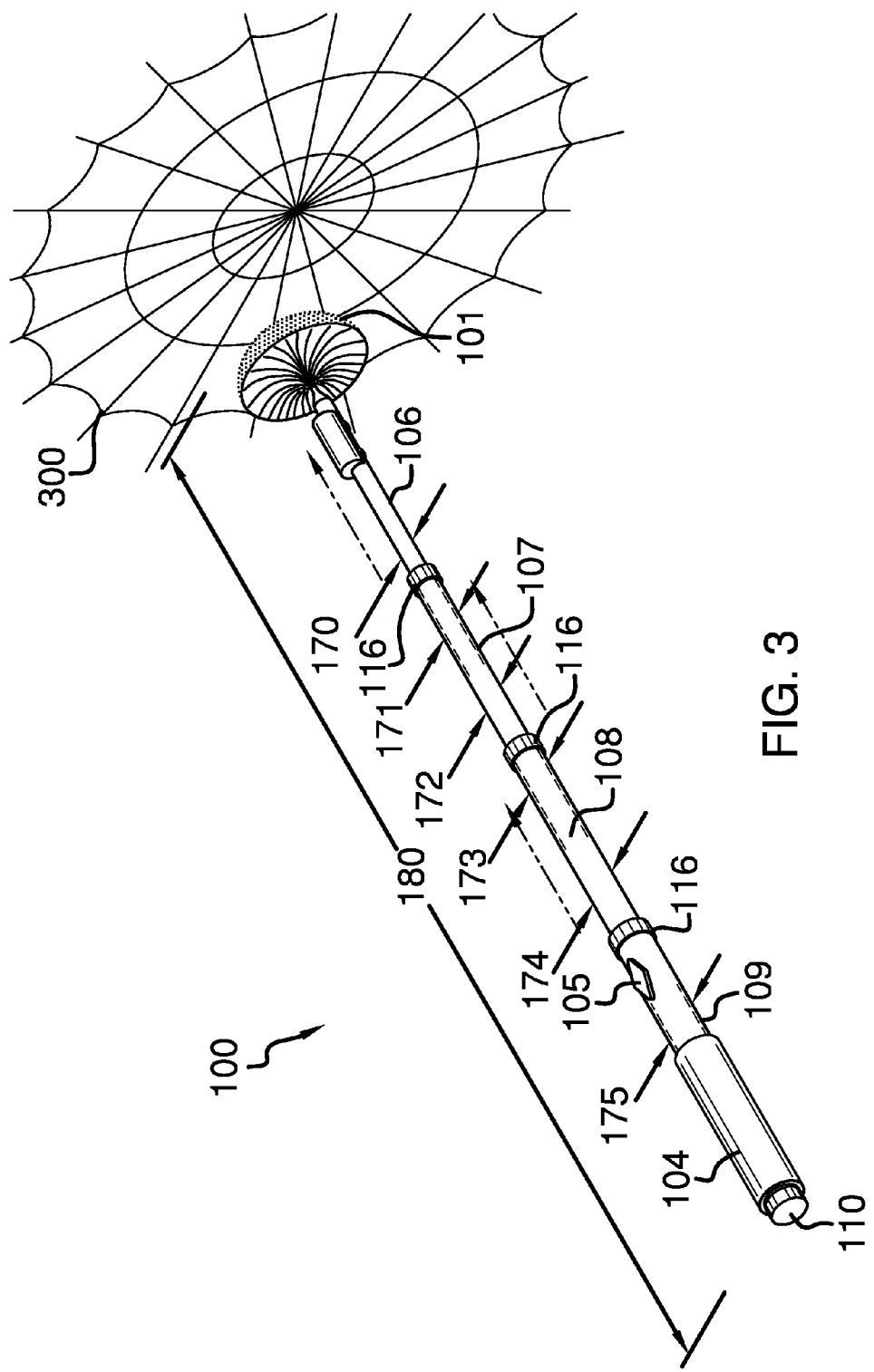
FIG. 3 is an expanded view of an embodiment of the disclosure.
Figure 4:
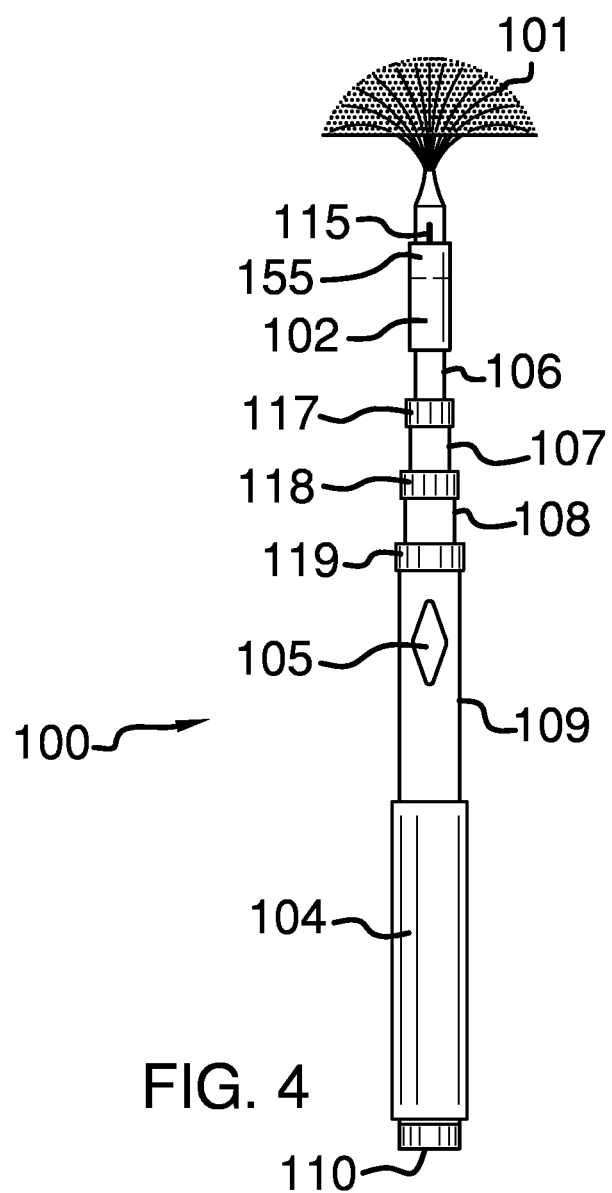
FIG. 4 is a front view of an embodiment of the disclosure.
Figure 5:
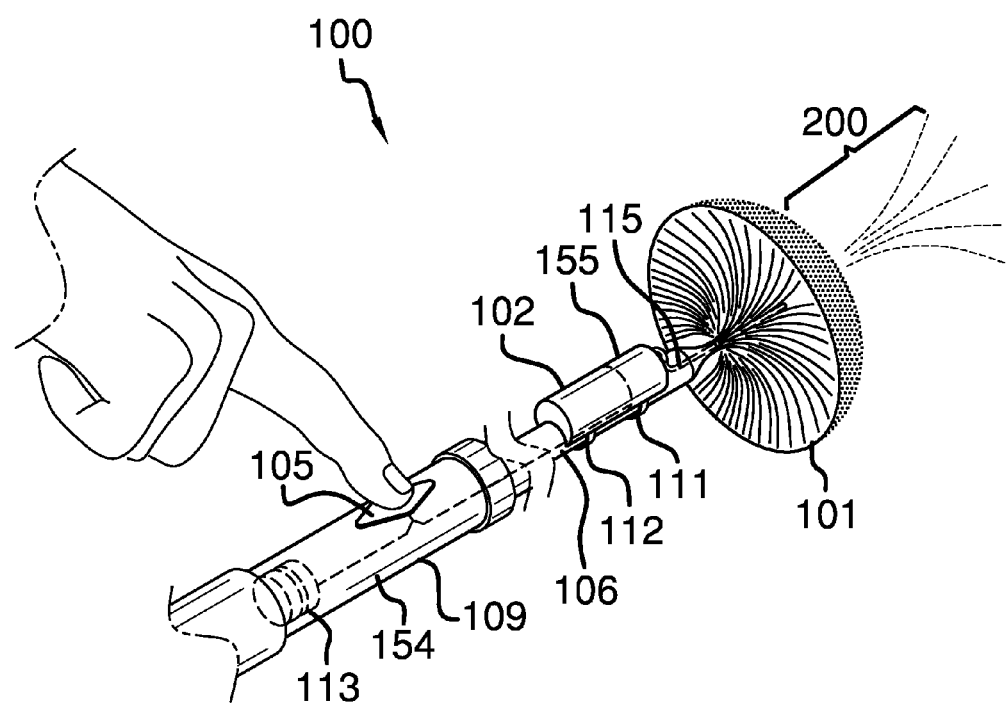
FIG. 5 is an in use view of an embodiment of the disclosure.

As illustrated in FIGS. 1 through 5 the telescoping spider web removal brush 100 (hereinafter invention) is comprised of a pesticide dispensing system, a telescopic wand 103, and a brush 101.

The pesticide dispensing system is comprised of a pesticide container 102, an application button 105, a pump 155, a supply tube 115, a first attachment band 111, a second attachment band 112, and an electrical power source 113.

The pesticide container 102 is adapted to store a pesticide 200 that is used to eradicate spiders. The pesticide container 102 can be refillable or replaceable. Mounted within or near the pesticide container 102 is the 155 pump that is used to pressurize the pesticide 200 into the supply tube 115. The supply tube 115 extends from the pump 155 over to the brush 101. The pump 155 distributes the pesticide 200 using either a first design scenario or a second design scenario. In the first design scenario, the pump 155 is sized to disperse the pesticide 200 as a spray mist that is released as the spider webs are being removed by the brush 101. In the second design scenario, the pesticide 200 is pumped directly into the brush 101, which is then wicked into the brush materials. In the second design scenario, the pesticide 200 is dispersed when the brush 101 contacts the surfaces that support a spider web 300.

The application button 105 is used to provide electrical power from the electrical power source 113 to the pump 155. The application button 105 is an electric switch that completes a circuit between the electrical power source 113 located in a fourth hollow extension rod 109 and the pump 155 located near the pesticide container 102. When the electrical circuit between the electrical power source 113 and the pump 155 is completed, the pump 155 pressurizes the pesticide 200 from the container 102 through the tube 115 for dispersal from or into the brush 101. The pesticide container 102 is attached to a first hollow extension rod 106 using the first attachment band 111 and the second attachment band 112. The first attachment band 111 and second attachment band 112 are small strips of materials that are used to lash the pesticide container 102 to the first hollow extension rod 106. The electrical power source 113 comprises the use of at least one battery. Moreover, a wire 154 extends from the pump 155 to the application button 105, and to the electrical power source 113.

It shall be noted that the application button 105 may manually operate the pump 155 in that the application button 105 may act as an actuating force for a mechanical pump that draws the pesticide 200 into the tube 115. The mechanical version of the pump 155 is well known, and utilizes a spring and valve mechanisms that are commonly used in hand soap dispensers. Moreover, the mechanical version of the pump 155 does not require the use of the electrical power source 113.

The telescopic wand 103 is comprised of a plurality of hollow extension rods 120, a plurality of extensible collars 116, a handgrip 104, and an optional end cap 110.

The plurality of hollow extension rods 120 are arranged in a concentric telescopic arrangement. In this arrangement, an example of which is shown in the first potential embodiment that is illustrated in FIGS. 1 through 5, a first outer diameter 170 of the first hollow extension rod 106 is smaller than a second inner diameter 171 of a second hollow extension rod 107, and thereby allowing the first hollow extension rod 106 to slide within the second hollow extension rod 107. Similarly, a third outer diameter 172 of the second hollow extension rod 107 is smaller than a fourth inner diameter 173 of a third hollow extension rod 108, and thereby allowing the second hollow extension rod 107 to slide within the third hollow extension rod 108. A fifth outer diameter 174 of the third hollow extension rod 108 is smaller than a fifth inner diameter 175 of the fourth hollow extension rod 109, and thereby allowing the third hollow extension rod 108 to slide within the fourth hollow extension rod 109. When assembled in this manner, the sliding nature of the plurality of hollow extension rods 120 allows adjustment of an overall length 180 of the invention 100 by adjusting the plurality of hollow extension rod 120 relative to one another.

Once the plurality of hollow extension rods 120 are placed in their relative position, the plurality of hollow extension rods 120 are held in place using a plurality of extensible collars 116. Each of the plurality of extensible collar 116 is a mechanism that tightens to securely hold two adjacent of the plurality of hollow extension rods 120 in place.

An example of this is shown in the first potential embodiment that is illustrated in FIGS. 1 through 4 where the position of the first hollow extension rod 106 relative to the second hollow extension rod 107 is held securely in place with the first extensible collar 117. Similarly, the position of the second hollow extension rod 107 relative to the third hollow extension rod 108 is held securely in place with the second extensible collar 118 and the position of the third hollow extension rod 108 relative to the fourth hollow extension rod 109 is held securely in place with the third extensible collar 119.

The handgrip 104 allows for the comfort and convenience of the operator. When the electric power source 113 is included, the end cap 110 is provided, and is removable to access the electric power source 113 for maintenance and replacement purposes.

As shown in FIGS. 1 through 5, the brush 101 is mounted on the first hollow extension rod 106. More specifically, the brush 101 is mounted on the first hollow extension rod 106 in such a way that the tube 115 carrying pesticide 200 from the pump 155 and the pesticide container 102 can slide into the bristles of the brush 101. The pesticide container 102 can be made out of several materials including, but not limited to, glass, plastic or metal. The tube 115 is made of flexible plastic tubing that can be made from, but is not limited to, rubber, pvc or vinyl. The pump 155 can be either a commercially available electrical or mechanical pump (as previously described).

Telescopic wands are commercially available. Alternatively, hollow extension rods may be purchased commercially or be made out of several materials including, but not limited to, aluminum, pvc, polyethylene, or polycarbonate. The extensible collars may also be purchased commercially. The brush 101 is a soft bristled brush that can be purchased commercially. Rubberized handgrips and end caps are commercially available.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A telescoping spider web brush remover comprising:
   wherein a telescopic wand that includes a brush at a distal end;
   wherein a pesticide dispensing system is integrated into the telescopic wand such that the pesticide dispensing system is adapted to store and dispense a pesticide into or from said brush;
   wherein said brush is adapted to remove a spider web;
   wherein the pesticide dispensing system is comprised of a pesticide container, an application button, a pump, and a supply tube;
   wherein the telescopic wand comprises a plurality of hollow extension rods, a plurality of extensible collars, a handgrip, and an end cap;
   wherein the plurality of hollow extension rods are arranged in a concentric telescopic arrangement; wherein a first outer diameter of a first hollow extension rod is smaller than a second inner diameter of a second hollow extension rod, and thereby allowing the first hollow extension rod to slide within the second hollow extension rod; wherein a third outer diameter of the second hollow extension rod is smaller than a fourth inner diameter of a third hollow extension rod, and thereby allowing the second hollow extension rod to slide within the third hollow extension rod; wherein a fifth outer diameter of the third hollow extension rod is smaller than a fifth inner diameter of a fourth hollow extension rod, and thereby allowing the third hollow extension rod to slide within the fourth hollow extension rod;
   wherein the plurality of hollow extension rods are able to adjust an overall length of the telescopic wand;
   wherein a first attachment band, and a second attachment band are used to secure the pump and the pesticide container against the first hollow extension rod;

wherein the pesticide container is adjacent to the pump; wherein the pump pressurizes the pesticide into the supply tube; wherein the supply tube extends from the pump over to the brush; wherein the pump adaptively distributes the pesticide as a spray mist or directly into the brush, which is then wicked into the brush;

wherein the pump is electrical;

wherein the application button provides electrical power from an electrical power source to the pump; wherein the application button is an electric switch that completes a circuit between the electrical power source located in the fourth hollow extension rod and the pump located adjacent to the pesticide container.

2. The telescoping spider web brush remover according to claim 1 wherein the electrical power source comprises the use of at least one battery; wherein a wire extends from the pump to the application button, and to the electrical power source; wherein the wire forms the circuit.

3. The telescoping spider web brush remover according to claim 1 wherein the plurality of hollow extension rods are held in place using the plurality of extensible collars.

4. A telescoping spider web brush remover comprising:
wherein a telescopic wand that includes a brush at a distal end;
wherein a pesticide dispensing system is integrated into the telescopic wand such that the pesticide dispensing system is adapted to store and dispense a pesticide into or from said brush;
wherein said brush is adapted to remove a spider web;
wherein the pesticide dispensing system is comprised of a pesticide container, an application button, the pump, and a supply tube;
wherein the telescopic wand comprises a plurality of hollow extension rods, a plurality of extensible collars, a handgrip, and an end cap;
wherein the plurality of hollow extension rods are arranged in a concentric telescopic arrangement; wherein a first outer diameter of a first hollow extension rod is smaller than a second inner diameter of a second hollow extension rod, and thereby allowing the first hollow extension rod to slide within the second hollow extension rod; wherein a third outer diameter of the second hollow extension rod is smaller than a fourth inner diameter of a third hollow extension rod, and thereby allowing the second hollow extension rod to slide within the third hollow extension rod; wherein a fifth outer diameter of the third hollow extension rod is smaller than a fifth inner diameter of a fourth extension rod, and thereby allowing the third hollow extension rod to slide within the fourth hollow extension rod;

wherein the plurality of hollow extension rods are able to adjust an overall length of the telescopic wand;

wherein a first attachment band, and a second attachment band are used to secure the pump and the pesticide container against the first hollow extension rod;

wherein the pesticide container is adjacent to the pump;

wherein the pump pressurizes the pesticide into the supply tube; wherein the supply tube extends from the pump over to the brush; wherein the pump adaptively distributes the pesticide as a spray mist or directly into the brush, which is then wicked into the brush;

wherein the pump is electrical;

wherein the application button provides electrical power from an electrical power source to the pump; wherein the application button is an electric switch that completes the circuit between the electrical power source located in the fourth hollow extension rod and the pump located adjacent to the pesticide container;

wherein the electrical power source comprises the use of at least one battery; wherein a wire extends from the pump to the application button, and to the electrical power source; wherein the wire forms the circuit.

5. The telescoping spider web brush remover according to claim 4 wherein the plurality of hollow extension rods are held in place using the plurality of extensible collars.

* * * * *